US007158633B1

(12) United States Patent
Hein

(10) Patent No.: US 7,158,633 B1
(45) Date of Patent: Jan. 2, 2007

(54) METHOD AND APPARATUS FOR MONITORING SUBSCRIBER LOOP INTERFACE CIRCUITRY POWER DISSIPATION

(75) Inventor: Jerrell P. Hein, Driftwood, TX (US)

(73) Assignee: Silicon Laboratories, Inc., Austin, TX (US)

( * ) Notice: Subject to any disclaimer, the term of this patent is extended or adjusted under 35 U.S.C. 154(b) by 0 days.

(21) Appl. No.: 09/441,380

(22) Filed: Nov. 16, 1999

(51) Int. Cl.
*H04M 1/00* (2006.01)
*H04M 9/00* (2006.01)

(52) U.S. Cl. ............... 379/412; 379/339; 379/382; 361/79; 330/266; 330/298; 374/100; 702/130; 702/136

(58) Field of Classification Search ............... 379/399.01–413.04, 339, 382; 361/79, 86; 330/298
See application file for complete search history.

(56) References Cited

U.S. PATENT DOCUMENTS

| | | | | |
|---|---|---|---|---|
| 4,317,963 A | * | 3/1982 | Chea, Jr. ................ | 379/377 |
| 4,355,341 A | * | 10/1982 | Kaplan .................. | 379/412 |
| 4,456,991 A | * | 6/1984 | Chea et al. ............. | 370/359 |
| 4,727,450 A | * | 2/1988 | Fachinetti et al. ...... | 361/103 |
| 4,827,505 A | | 5/1989 | Takato et al. | |
| 4,856,059 A | * | 8/1989 | Halbig ................... | 379/412 |
| 4,982,307 A | * | 1/1991 | Patel | |
| 5,175,764 A | | 12/1992 | Patel et al. | |
| 5,347,577 A | | 9/1994 | Takato et al. | |

(Continued)

FOREIGN PATENT DOCUMENTS

GB    2032730 A    5/1980

OTHER PUBLICATIONS

Advanced Micro Devices, "Am7920: Subscriber Line Interface Circuit Preliminary Datasheet," Publication #19239, Rev. E, Jul. 1998.

(Continued)

*Primary Examiner*—Fan Tsang
*Assistant Examiner*—Ramnandan Singh
(74) *Attorney, Agent, or Firm*—Davis & Associates; William D. Davis

(57) ABSTRACT

Subscriber line interface circuitry includes an integrated circuit having sense inputs for a sensed tip signal and a sensed ring signal of a subscriber loop. The integrated circuit generates a subscriber loop linefeed driver control signal in response to the sensed signals. The linefeed driver does not reside with the integrated circuit. A method for monitoring power dissipation of the linefeed driver components includes the step of sampling at least one of the tip and ring signals to determine a line voltage and a line current of a selected linefeed driver component. Instantaneous power dissipation of the linefeed component is estimated and then filtered to generate an estimated junction temperature of the linefeed component. In one embodiment, the linefeed driver includes a tip fuse series-coupled to the tip line and a ring fuse series-coupled to the ring line. Voltages sampled from each side of the series-coupled tip fuse resistor and the series-coupled ring fuse and resistors collectively form the sensed tip signal and sensed ring signal, respectively. This enables using the same sensing circuitry for power monitoring as well as to determine other line conditions such as whether the fuses are blown without the use of separate sensing circuitry dedicated to that purpose. This approach reduces the number of pins on an integrated circuit needed to monitor power dissipation and determine pre-fuse line conditions.

16 Claims, 7 Drawing Sheets

U.S. PATENT DOCUMENTS

| | | | |
|---|---|---|---|
| 5,392,334 A | | 2/1995 | O'Mahony |
| 5,428,682 A | * | 6/1995 | Apfel |
| 5,488,631 A | * | 1/1996 | Gold et al. ............... 375/206 |
| 5,596,637 A | * | 1/1997 | Pasetti et al. |
| 5,636,273 A | | 6/1997 | Schopfer et al. |
| 5,828,748 A | | 10/1998 | Akhteruzzaman |
| 5,848,149 A | | 12/1998 | Chen et al. |
| 5,881,130 A | * | 3/1999 | Zhang |
| 5,917,382 A | * | 6/1999 | Chiozzi .................. 330/298 |
| 6,092,927 A | * | 7/2000 | Clemente |
| 6,219,417 B1 | * | 4/2001 | Zhou |
| 6,489,793 B1 | * | 12/2002 | Jones et al. |

OTHER PUBLICATIONS

Advanced Micro Devices, "Am79213/Am79C203/031: Advanced Subscriber Line Interface Circuit (ASLIC™) Device/Advanced Subscriber Line Audio-Processing Circuit (ASLAC™) Device Preliminary Datasheet," Publication #19770, Rev. B, Sep. 1998.

Advanced Micro Devices, "Am79231: Intelligent Subscriber Line Interface Circuit (ISLIC™) Advance Information Datasheet," Publication #22419, Rev. A, Sep. 1998.

Advanced Micro Devices, "Am79Q2241/2242/2243: Quad Intelligent Subscriber Line Audio-Processing Circuit (ISLAC™) Advance Information Datasheet," Publication #22421, Rev. A, Sep. 1998.

Advanced Micro Devices, "Am79R241: Intelligent Subscriber Line Interface Circuit (ISLIC™) Advance Information Datasheet," Publication #22420, Rev. A, Sep. 1998.

Advanced Micro Devices, "Am79R79: Ringing SLIC Device Technical Overview Application Note," Publication #19768, Rev. B, May 1997.

Lucent Technologies, "L8576 Dual Ringing SLIC Preliminary Datasheet," Mar. 1998.

SGS-Thomson Microelectronics, "L3000N/L3030 Subscriber Line Interface Kit Preliminary Data," Jan. 1995.

SGS-Thomson Microelectronics, "L3000S/L3030 Subscriber Line Interface Kit Preliminary Data," Jun. 1997.

SGS-Thomson Microelectronics, "L3037 Subscriber Line Interface Circuit," Dec. 1997.

SGS-Thomson Microelectronics, "SGS-Thomson SLIC AC Models Application Note," 1995.

Goodenough, F., "SLIC Ejects Relays From PABX Line Cards", Electronic Design, vol. 42, No. 14, Jul. 11, 1994, pp. 55-56, 58-59, 62-64, Penton Publishing, Cleveland, OH.

* cited by examiner

METHOD AND APPARATUS FOR MONITORING SUBSCRIBER LOOP INTERFACE CIRCUITRY POWER DISSIPATION

FIELD OF THE INVENTION

This invention relates to the field of telecommunications. In particular, this invention is drawn to subscriber loop interface circuitry.

BACKGROUND OF THE INVENTION

Subscriber line interface circuits are typically found in the central office exchange of a telecommunications network. A subscriber line interface circuit (SLIC) provides a communications interface between the digital switching network of a central office and an analog subscriber line. The analog subscriber line connects to a subscriber station or telephone instrument at a location remote from the central office exchange.

The analog subscriber line and subscriber equipment form a subscriber loop. The interface requirements of an SLIC typically result in the need to provide relatively high voltages and currents for control signaling with respect to the subscriber equipment on the subscriber loop. Voiceband communications are typically low voltage analog signals on the subscriber loop. Thus the SLIC must detect and transform low voltage analog signals into digital data for transmitting communications received from the subscriber equipment to the digital network. For bi-directional communication, the SLIC must also transform digital data received from the digital network into low voltage analog signals for transmission on the subscriber loop to the subscriber equipment.

One SLIC design includes discrete passive inductive components such as transformers for handling the higher voltages and currents. Disadvantages of this design include the bulkiness, weight, and power consumption of the passive inductive components.

Another SLIC design incorporates multiple specialized integrated circuits to achieve a transformerless SLIC. Typically one integrated circuit is dedicated to handling the low voltage digital signaling and another integrated circuit is dedicated to handling the higher powered analog control signaling functions required for the subscriber loop. One disadvantage of this design is that programming of various SLIC operational characteristics is typically accomplished using discrete components such that the SLIC operational characteristics are not dynamically modifiable. In addition, the integrated circuit handling the higher powered analog control signaling functions tends to be relatively expensive.

SUMMARY OF THE INVENTION

In view of limitations of known systems and methods a subscriber line interface circuit is described. The subscriber line interface circuitry includes an integrated circuit having sense inputs for a sensed tip signal and a sensed ring signal of a subscriber loop. The integrated circuit generates a subscriber loop linefeed driver control signal in response to the sensed signals. The linefeed driver does not reside with the integrated circuit.

A method for monitoring power dissipation of the linefeed driver components includes the step of sampling at least one of a tip and a ring signal to determine a line voltage and a line current of a linefeed component of the subscriber loop. An instantaneous power dissipation of the linefeed component is estimated. The estimated instantaneous power dissipation is filtered to generate an estimated junction temperature of the linefeed component.

An apparatus for monitoring power dissipation of a selected linefeed component includes an analog-to-digital converter (ADC) for providing a sampled value from at least one of a tip and a ring line. A power calculator calculates an instantaneous power dissipation of the selected linefeed component from the sampled value and control currents provided to a plurality of linefeed driver components. A filter provides an estimated junction temperature of the selected linefeed component from the instantaneous power dissipation.

In one embodiment, a subscriber loop interface circuit includes a signal processor with sense inputs for sensing a tip line and a ring line of the subscriber loop. The signal processor generates subscriber loop control signals in response to the sensed inputs. A linefeed driver drives the subscriber loop in accordance with the subscriber loop control signals. The linefeed driver includes a tip fuse series-coupled to a tip resistor and the tip line and a ring fuse series-coupled to a ring resistor and the ring line. Voltages sampled from each side of the series-coupled tip fuse and resistor collectively form the sensed tip signal. Voltages sampled from each side of the series-coupled ring fuse and resistor collectively form the sensed ring signal.

Another feature is that sensing of the tip and ring lines for subscriber loop control can be accomplished across components including tip or ring inline protective devices such as fuses such that one lead of a pair of sense leads is unprotected by the fuse and the other lead is protected by the fuse. This enables using the same sensing circuitry for power monitoring as well as to determine other line conditions such as whether the fuses are blown without the use of separate sensing circuitry dedicated to that purpose. This approach reduces the number of pins on an integrated circuit needed to monitor power dissipation and determine pre-fuse line conditions.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
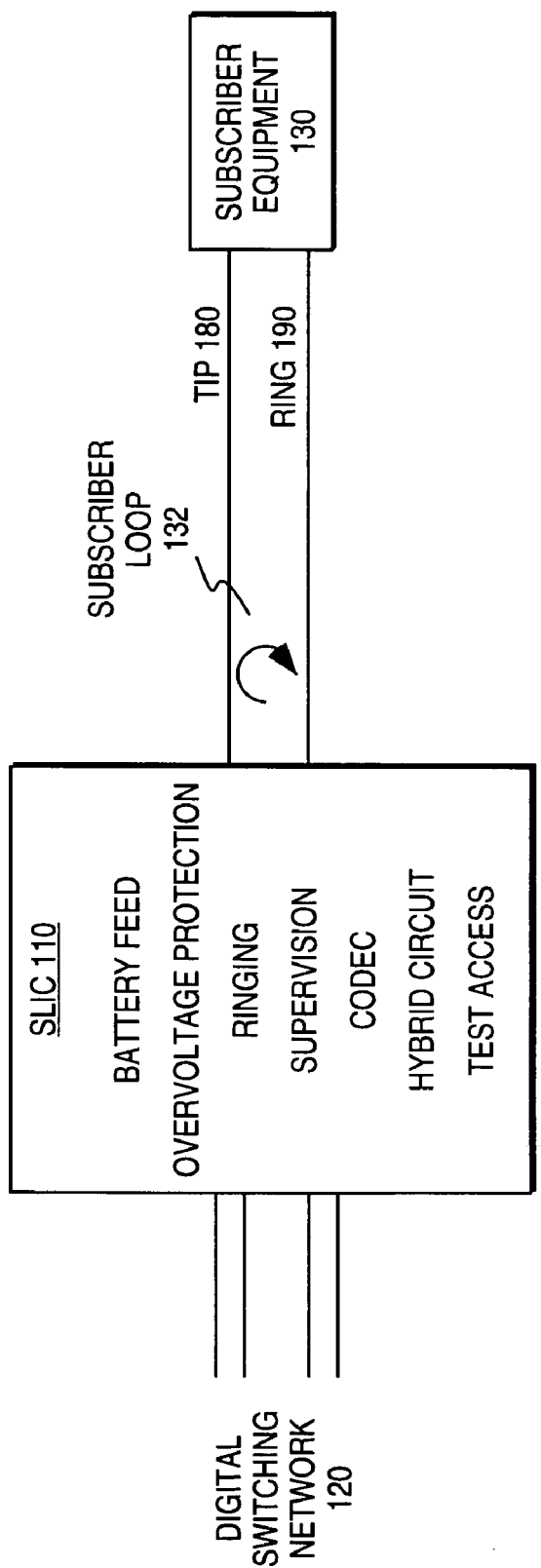
FIG. 1 illustrates one embodiment of a central office exchange including a subscriber line interface circuit (SLIC) coupling subscriber equipment to a digital switching system.

FIG. 1 illustrates functional elements of one embodiment of a subscriber line interface circuit (SLIC) 110 typically associated with plain old telephone services (POTS) telephone lines. The subscriber line interface circuit (SLIC) provides an interface between a digital switching network 120 of a local telephone company central exchange and a subscriber loop 132 including subscriber equipment 130.

The subscriber loop 132 is typically used for communicating analog data signals (e.g., voiceband communications) as well as subscriber loop "handshaking" or control signals. The analog data signals are typically on the order of 1 volt peak-to-peak (i.e., "small signal"). The subscriber loop control signals typically consist of a 48 V d.c. offset and an a.c. signal of 40–140 Vrms (i.e., "large signal"). The subscriber loop state is often specified in terms of the tip 180 and ring 190 portions of the subscriber loop.

The SLIC is expected to perform a number of functions often collectively referred to as the BORSCHT requirements. BORSCHT is an acronym for "battery feed," "overvoltage protection," "ring," "supervision," "codec," "hybrid," and "test."

The SLIC provides power to the subscriber equipment 180 using the battery feed function. The overvoltage protection function serves to protect the central office circuitry against voltage transients that may occur on the subscriber loop 132. The ring function enables the SLIC to signal the subscriber equipment 180. In one embodiment, subscriber equipment 180 is a telephone. Thus, the ring function enables the SLIC to ring the telephone.

The supervision function enables the SLIC to detect service requests such as when the caller goes off-hook. The supervision function is also used to supervise calls in progress and to detect dialing input signals.

The hybrid function provides a conversion from two wire signaling to four wire signaling. The SLIC includes a codec to convert the four-wire analog voiceband data signal into serial digital codes suitable for transmission by the digital switching network 120. In one embodiment, pulse code modulation is used to encode the voiceband data. The SLIC also typically provides a means to test for or to indicate faults that may exist in the subscriber loop or the SLIC itself.

The codec function has relatively low power requirements and can be implemented in a low voltage integrated circuit operating in the range of approximately 5 volts or less. The battery feed and supervision circuitry typically operate in the range of 40–75 volts. In some implementations the ringing function is handled by the same circuitry as the battery feed and supervision circuitry. In other implementations, the ringing function is performed by higher voltage ringing circuitry (75–150 $V_{rms}$). Thus depending upon implementation, the ringing function as well as the overvoltage protection function may be associated with circuitry having greater voltage or current operating requirements than the other circuitry.

Recent transformerless SLIC designs tend to distribute the functional requirements between two integrated circuits based on whether the functions are traditionally associated with the high voltage subscriber loop controls or the low voltage data processing. For example, in one embodiment, the codec is implemented in a low voltage integrated circuit and the remaining functions (e.g., supervision) are implemented primarily in a high voltage integrated circuit such as a bipolar integrated circuit. Although this design tends to offer considerable space, weight, and power efficiencies over designs requiring passive inductive components, this distribution of the functional requirements tends to result in a relatively expensive high voltage integrated circuit.

Figure 2:
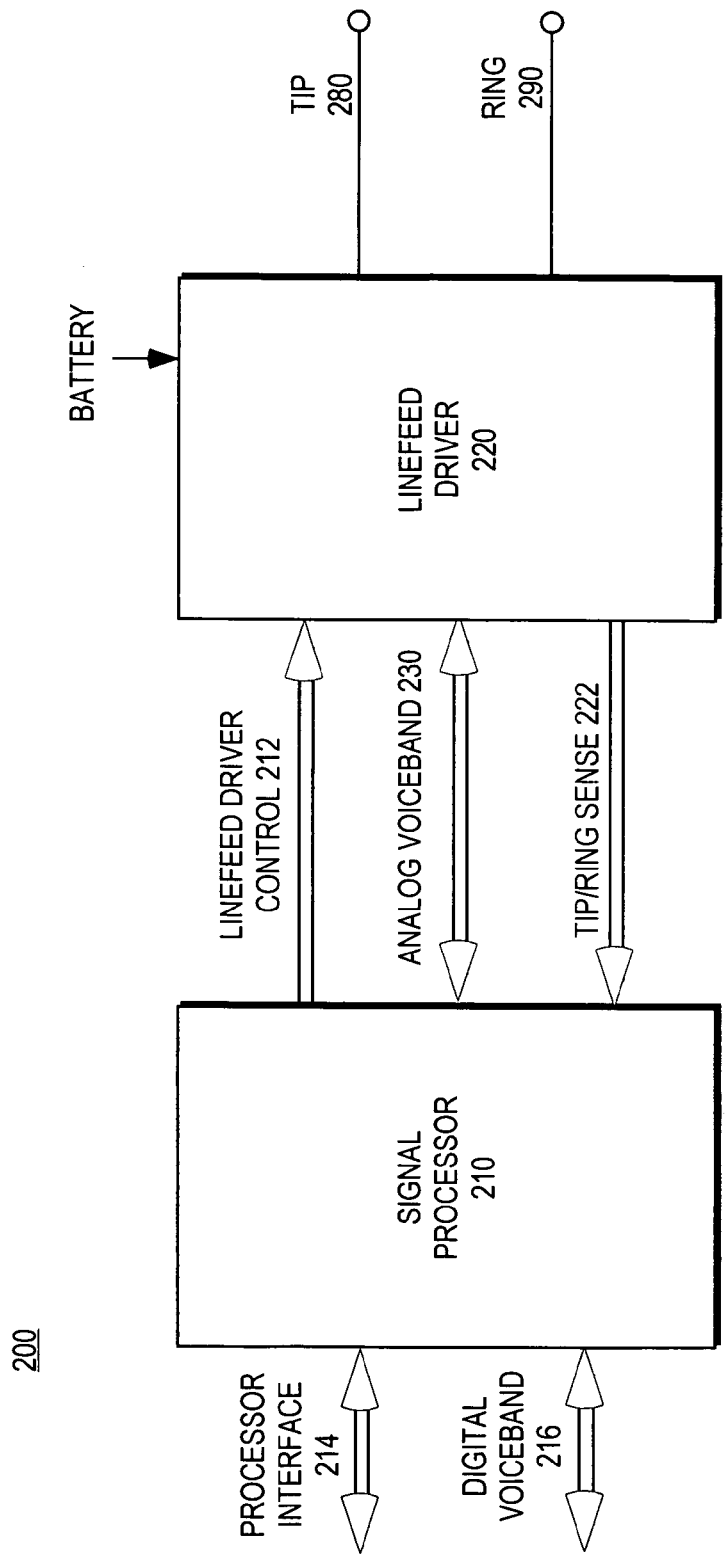
FIG. 2 illustrates a block diagram of an SLIC including a signal processor and a linefeed driver.

FIG. 2 illustrates one embodiment of an SLIC 200 wherein the BORSCHT functions have been redistributed between a signal processor 210 and a linefeed driver 220. Signal processor 210 is responsible for at least the ring control, supervision, codec, and hybrid functions. Signal processor 210 controls and interprets the large signal subscriber loop control signals as well as handling the small signal analog voiceband data and the digital voiceband data.

In one embodiment, signal processor 210 is an integrated circuit. The integrated circuit includes sense inputs for a sensed tip and ring signal of the subscriber loop. The integrated circuit generates subscriber loop linefeed driver control signal in response to the sensed signals. In one embodiment, the linefeed driver does not reside within the integrated circuit or within the same integrated circuit package as the signal processor 210.

Signal processor 210 receives subscriber loop state information from linefeed driver 220 as indicated by tip/ring sense 222. This information is used to generate control signals for linefeed driver 220 as indicated by linefeed driver control 212. The voiceband 230 signal is used for bi-directional communication of the analog voiceband data between linefeed driver 220 and signal processor 210.

Signal processor 210 includes a digital interface for communicating digitized voiceband data to the digital switching network using digital voiceband 216. In one embodiment, the digital interface includes a processor interface 214 to enable programmatic control of the signal processor 210. The processor interface effectively enables programmatic or dynamic control of battery control, battery feed state control, voiceband data amplification and level shifting, longitudinal balance, ringing currents, and other subscriber loop control parameters as well as setting thresholds such as a ring trip detection thresholds and an off-hook detection threshold.

The digital voiceband data 214 is coupled to a digital codec interface of signal processor 210 for bi-directional communication of the digital voiceband data between the codec of the signal processor and the digital switching network. The analog voiceband data 230 is coupled to an analog codec interface of signal processor 210 for bi-directional communication of the analog voiceband data between the codec and the linefeed driver.

Linefeed driver 220 maintains responsibility for battery feed to tip 280 and ring 290. Overvoltage protection is not explicitly illustrated, however, overvoltage protection can be provided by fuses incorporated into linefeed driver 220, if desired. Linefeed driver 220 includes sense circuitry to provide signal processor 210 with pre-determined sensed subscriber loop operating parameters as indicated by tip/ring sense 222. Signal processor 210 performs any necessary processing on the sensed parameters in order to determine the operational state of the subscriber loop. For example, differences or sums of sensed voltages and currents are performed as necessary by signal processor 210 rather than linefeed driver 220. Thus common mode and differential mode components (e.g., voltage and current) of the subscriber loop are calculated by the signal processor rather than the linefeed driver.

Linefeed driver 220 modifies the large signal tip and ring operating conditions in response to linefeed driver control 212 provided by signal processor 210. This arrangement enables the signal processor to perform processing as needed to handle the majority of the BORSCHT functions. For example, the supervisory functions of ring trip, ground key, and off-hook detection can be determined by signal processor 210 based on operating parameters provided by tip/ring sense 222.

Figure 3:
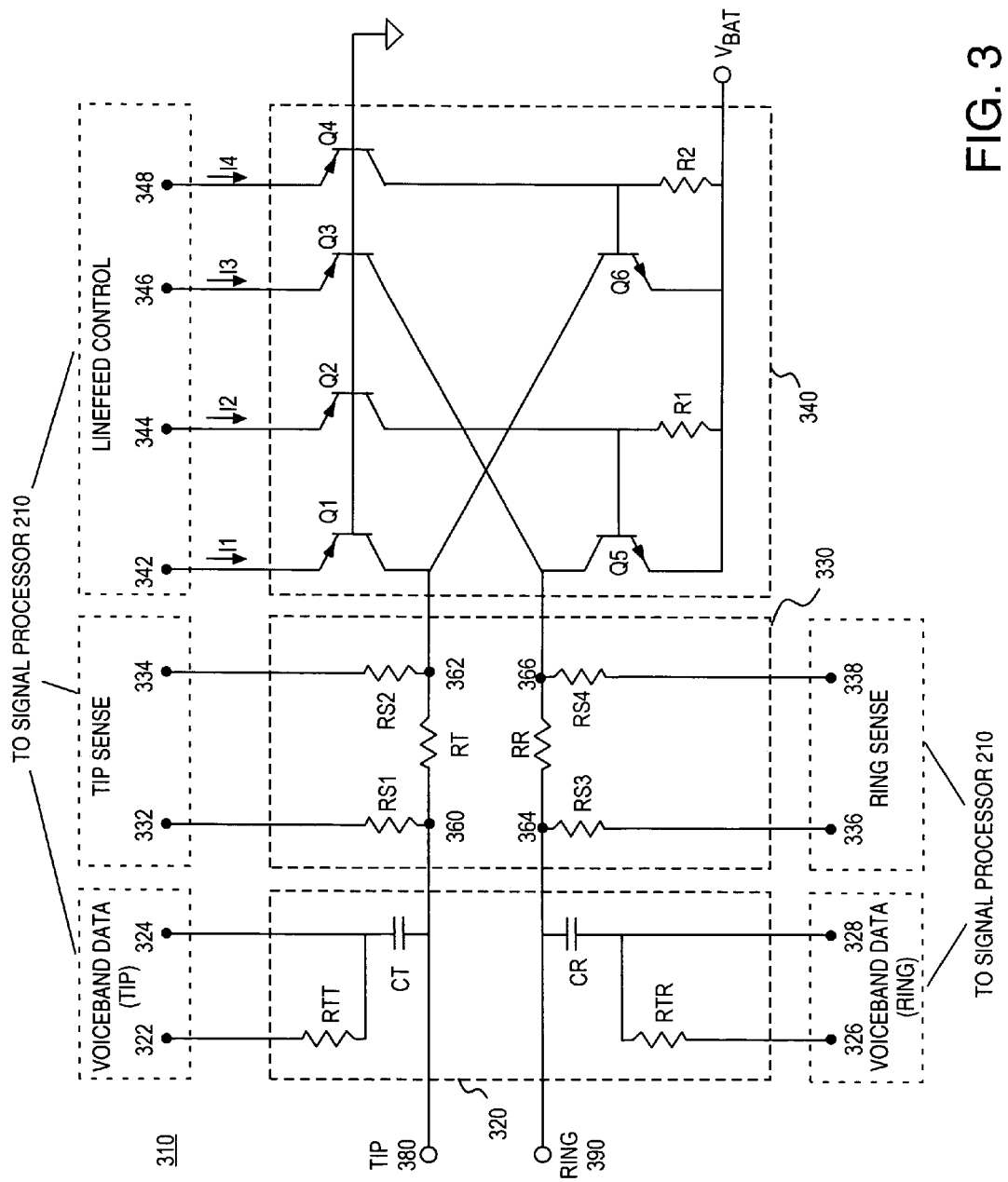
FIG. 3 illustrates one embodiment of an SLIC linefeed driver.

FIG. 3 illustrates one embodiment of an SLIC linefeed driver 300. In one embodiment, the linefeed driver 300 is implemented as a number of discrete components. Linefeed driver 300 includes a voiceband circuitry 320, sensing circuitry 330, and power circuitry 340.

Voiceband circuitry 320 enables data signals corresponding to voiceband communications to be retrieved from or impressed onto the subscriber loop. Capacitors CR and CT effectively provide a.c. coupling for the analog voiceband data from the subscriber loop to the signal processor while decoupling signal processor 210 from the d.c. offsets of the tip 380 and ring 390 nodes. Thus capacitors CR and CT effective provide d.c. isolation of the analog voiceband data interface formed by nodes 322–328 from the subscriber loop. In the embodiment illustrated, voiceband circuitry 320 provides a.c. coupling of the analog voiceband data between the subscriber loop and the signal processor using only passive components.

Voiceband communication is bi-directional between the subscriber loop and signal processor 210. Nodes 324 and 328 serve to communicate voiceband data from the subscriber loop to signal processor 210 (i.e., tip and ring "audio in"). Nodes 322 and 326 provide a means of impressing a signal on the subscriber loop from signal processor 210 (i.e., tip and ring "audio out"). In one embodiment RTT and RTR collectively establish a 600Ω termination impedance.

Sensing circuitry 330 enables signal processor 210 to determine the tip 380 and ring 390 node voltages as well as the subscriber loop current using sensing resistors RS1, RS2, RS3, and RS4. Resistors RT and RR are used to generate a voltage drop for determining the tip and ring currents. In one embodiment, sensing circuitry 330 consists only of passive discrete components.

Referring to FIG. 2, tip/ring sense 222 includes a sensed tip signal and a sensed ring signal. In one embodiment, the sensed tip signal includes first and second sampled tip voltages. Resistors RS1 and RS2 are used to sample the tip line voltage at each end of RT. Resistors RS1 and RS2 convert the sampled tip line voltages to currents suitable for handling by signal processor 210 at nodes 332 and 334. The difference between the first and second sampled tip voltages is proportional to the tip current. Likewise, the sensed ring signal includes first and second sampled ring voltages. Resistors RS3 and RS4 similarly convert sampled ring line voltages at both ends of RR to currents suitable for handling by signal processor 210 at nodes 336 and 338. The difference between the first and second sampled ring voltages is proportional to the ring current. These calculations, however, can be performed as necessary by the signal processor 210 rather than the linefeed driver 220 circuitry. In addition, these sensed parameters enable the signal processor 210 to determine the subscriber loop voltage and the subscriber loop common mode and differential mode currents.

Power circuitry 340 provides the battery feed and other relatively high voltage functions to the subscriber loop in accordance with analog linefeed control signals provided by the signal processor 210 at nodes 342, 344, 346, and 348. Processing of the sensed parameters of the tip and ring lines for generating the linefeed control signals is handled exclusively by signal processor 210.

The subscriber loop current and the tip and ring voltages are controlled by transistors Q1–Q6. In one embodiment, Q1–Q4 are PNP bipolar junction transistors and Q5–Q6 are NPN bipolar junction transistors. Given that the base terminals of Q1–Q4 are coupled to ground, nodes 342–348 need only be approximately 0.7 volts to turn on transistors Q1–Q4. Due to the small voltage drop between the base and emitters of Q1–Q4, control of the linefeed circuitry requires relatively low power and thus linefeed driver control currents I1–I4 may be provided by a signal processor 210 implemented as a low voltage complementary metal oxide semiconductor (CMOS) integrated circuit.

Transistors Q1, Q4, and Q6 (and resistor R2) control the tip voltage 380. The tip voltage is increased by the application of control current I1 to Q1. The tip voltage (node 380) is decreased by the application of control current I4 to Q4. Thus control currents I1 and I4 effectively provide a tip control signal for manipulating the tip voltage at node 380.

Similarly, transistors Q2, Q3, and Q5 (and resistor R1) control the ring voltage 390. The application of control current I3 to Q3 increases the ring voltage. The ring voltage is decreased by the application of control current I2 to Q2. Control currents I2 and I3 effectively provide a ring control signal for manipulating the ring voltage at node 390.

Control currents I1–I4 thus effectively control the large signal subscriber loop current and tip and ring voltages. For example, the ringing signal can be generated by using the control signals at nodes 342–348 to periodically reverse the polarity of tip 380 with respect to ring 390 (i.e., battery polarity reversal) at the nominal ringing frequency.

Sensing portion 330 enables signal processor 210 to determine the large signal state of the subscriber loop without the need for intervening active circuitry or level shifters. In one embodiment, sensing portion 330 comprises only passive discrete components. The linefeed control inputs 342–348 enable signal processor 210 to actively manage the large signal state of the subscriber loop. In particular, the large signal a.c. and d.c. components of the subscriber loop control protocol can now be controlled directly by a low voltage integrated circuit. The large signal a.c. and d.c. control loops are effectively terminated at the signal processor 210.

In other words, the large signal a.c. and d.c. control loops are terminated at the low voltage integrated circuit. Thus signal processing and state determination such as off-hook, ring trip, and ring control formerly associated with high power analog circuitry can be handled predominately by a low voltage integrated circuit. In addition, the integrated circuit signal processor can handle processing of the small signal analog voiceband data from the subscriber loop without the need for intervening active elements or level shifting circuitry.

Figure 4:
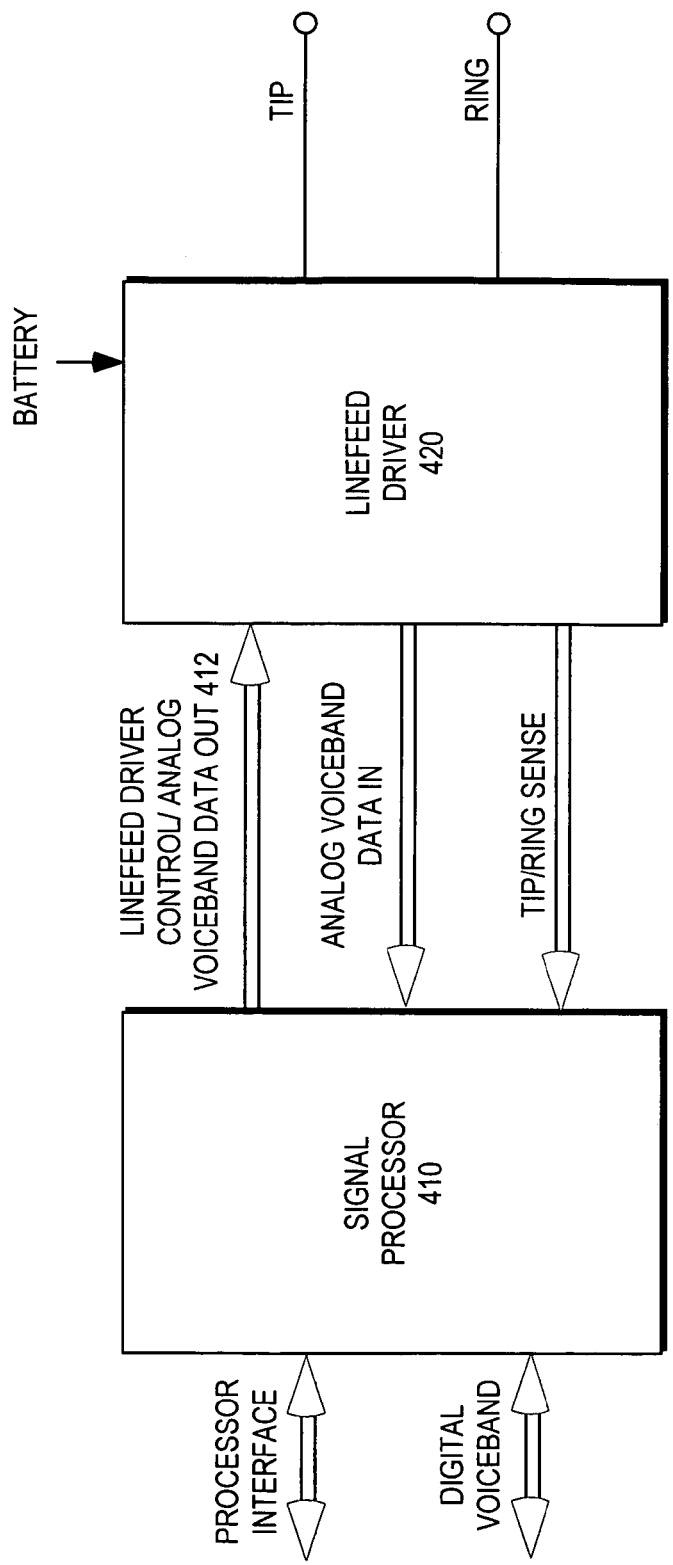
FIG. 4 illustrates a block diagram of an alternative embodiment of the SLIC.

FIG. 4 illustrates a block diagram of an alternative embodiment of an SLIC. Comparing FIG. 4 with FIG. 2, the primary difference is that a portion of the voiceband communication function (230) is handled by the same signal lines handling the linefeed driver control (212). In particular, signal lines 412 combine the linefeed driver control function with transmission of voiceband communications from the signal processor 410 to the linefeed driver 420 (i.e., audio out) for communication to the subscriber equipment.

Referring to FIG. 3, this is accomplished in one embodiment by superimposing the a.c. voiceband communications on the control currents I1 and I4. The bi-directional voiceband data interface includes nodes 324, 328, 342, and 348. Accordingly resistors RTT and RTR are eliminated in this configuration thus reducing the number of discrete components. Another advantage of this configuration is that the termination impedance previously determined by the values of RTT and RTR can now be set by controlling currents I1–I4. The use of a programmable signal processor 410 effectively places the value of the termination impedance formerly determined by RTT and RTR under programmatic control.

In one embodiment, line drive transistors Q1–Q6 are monitored to ensure that the actual line current and voltages do not result in values that exceed the power dissipation ratings of these components. In one embodiment, the monitoring is performed by the signal processor.

Figure 5:
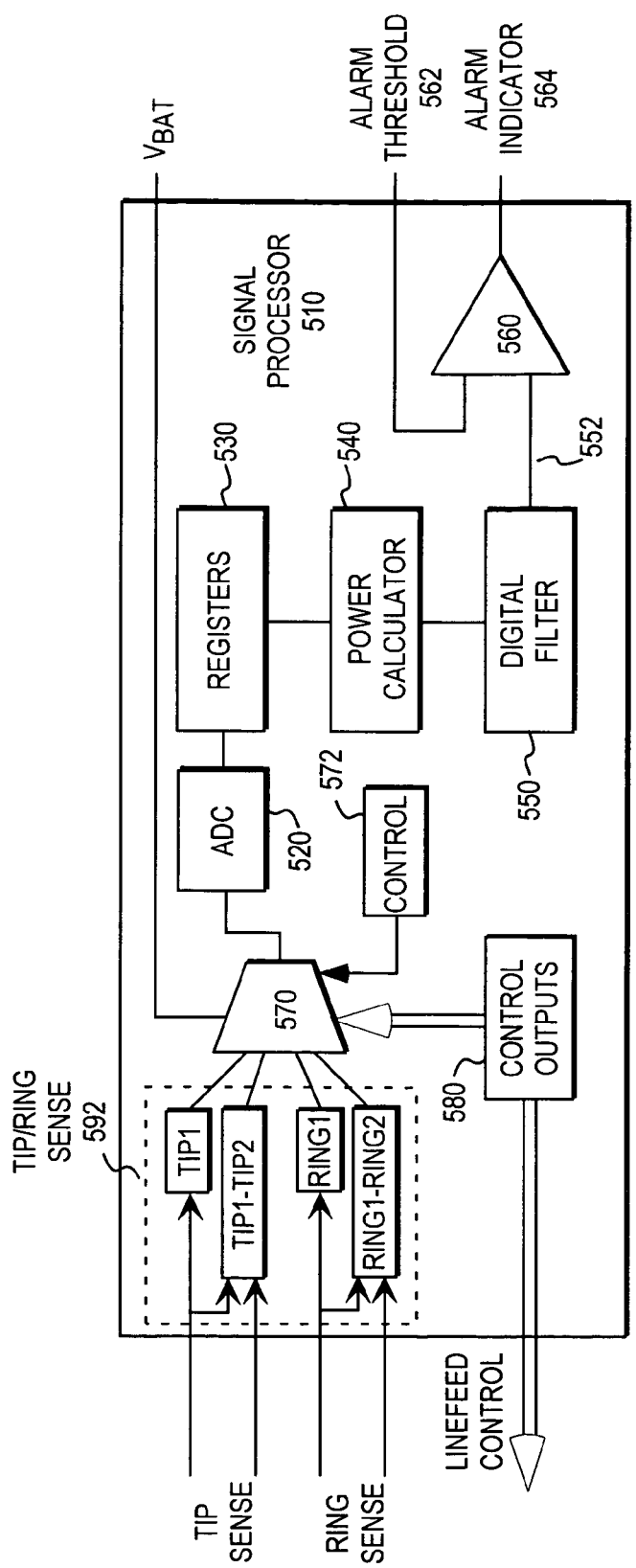
FIG. 5 illustrates power monitoring circuitry within the signal processor.
Figure 7:
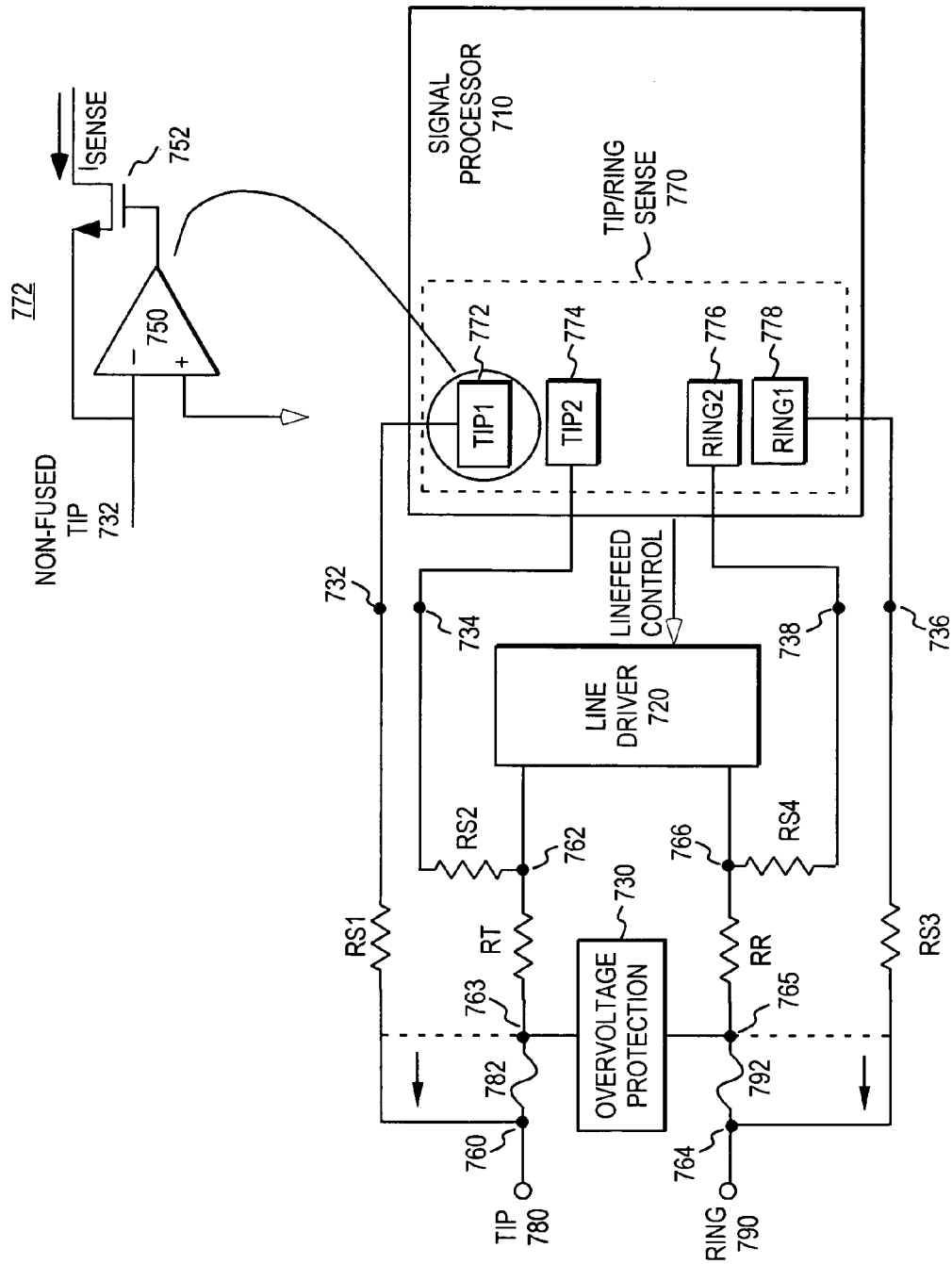
FIG. 7 illustrates one embodiment of the subscriber line interface circuit wherein at least one of each of the tip and ring sense lines is coupled to the unprotected side of a fused subscriber loop circuit.

FIG. 5 illustrates a signal processor 510 including components for monitoring the linefeed drive components Q1–Q6. Analog-to-digital converter (ADC) 520 generates digital values corresponding to the sensed tip and ring node voltages provided by tip/ring sense circuitry 592. In one embodiment, the tip/ring sense circuitry provides TIP1, TIP1–TIP2, RING1, and RING1–RING2 to ADC 520. Referring to FIG. 3, TIP1 is coupled to node 332 and internally to TIP1–TIP2, node 334 is coupled to TIP1–TIP2, RING1 is coupled to node 336 and internally to RING1–RING2, and node 338 is coupled to RING1–RING2. The differential signals can easily be determined through the use of a differential amplifier. The differential signals are proportional to the tip and ring line currents. These values are particularly useful for analog control of the subscriber loop. In an alternative embodiment, the differences are calculated by the power calculator 540 when determining instantaneous power dissipation (as illustrated in FIG. 7).

Referring to FIGS. 3 and 5, the linefeed control outputs I1–I4 are provided by control outputs 580. These currents are also sampled by ADC 520. In one embodiment, $V_{BAT}$ is also sampled by ADC 520. Alternatively, $V_{BAT}$ may be assumed to have a pre-determined value. The digital representation of sampled values corresponding to TIP1, TIP1–TIP2, RING1, RING1–RING2, I1, I2, I3, I4, and $V_{BAT}$ are stored in storage registers 530.

In one embodiment, instantaneous power dissipation for Q1–Q6 is calculated as $V_{CE} \cdot I_C$. The values stored in registers 530 can then be used by power calculator 540 to determine instantaneous power dissipation for each of Q1–Q6. In one embodiment, power calculator 540 includes a multiplier.

The collector voltages (i.e., $V_{CQ1}$, $V_{CQ2}$) are known because the voltage at node 362 (i.e., $V_{362}$) can readily be determined by the tip sense circuitry. Similarly, $V_{CQ3}$ and $V_{CQ5}$ are known because the voltage at node 366 can readily be determined by the ring sense circuitry. $V_{BE}$ for each of transistors Q1–Q6 is approximately 0.7 V or –0.7 V depending upon transistor type. $V_{BAT}$ is either sensed or pre-determined.

With respect to Q1, $V_{CE}$ can readily be calculated from the known collector voltage ($V_{CQ1}$) and base-emitter junction voltage. Thus the instantaneous power dissipation ($p_{Q1}$) can be calculated from $V_{CEQ1}$ and I1. Similarly, for Q3 $V_{CEQ3}$ can readily be calculated from the known collector voltage ($V_{CQ3}$) and base-emitter junction voltage. Q3 instantaneous power dissipation can then be calculated from I3 and $V_{CE}$ of Q3. The instantaneous power dissipation for Q1 and Q3 are calculated as follows:

$$p_{Q1}=I1\cdot(+0.7-V_{362})$$

$$p_{Q3}=I3\cdot(+0.7-V_{366})$$

The $V_{BE}$ for Q5 and Q6 is approximately 0.7 V. Thus the voltage drop across resistors R1 and R2 is also 0.7 V. This information in conjunction with the value of $V_{BAT}$ enables determination of the collector voltages $V_{CQ2}$ and $V_{CQ4}$. Given the base of transistors Q2 and Q4 are coupled to signal ground, $V_{CQ2}$ and $V_{CQ4}$ also represent the collector-to-base junction voltages for their respective transistors. The $V_{BE}$ for these transistors is approximately –0.7 V, thus enabling a determination of $V_{CE}$ for transistors Q2 and Q4. Thus instantaneous power dissipation for Q2 and Q4 can be determined from I2, I4 and the $V_{CE}$ for the respective transistors as follows:

$$p_{Q2}=I2\cdot(-V_{BAT}+0.7+-0.7V)=-I2\cdot V_{BAT}$$

$$p_{Q4}=I4\cdot(-V_{BAT}+0.7+-0.7V)=-I4\cdot V_{BAT}$$

The voltages at nodes 360, 362, 364, and 366 are known as a result of sampling at nodes 332, 334, 336, and 338. With respect to Q6, the tip current through RT (i.e., $I_{RT}$) is determined as $$I_{RT} = \frac{V_{360} - V_{362}}{RT}.$$

The base currents of Q1–Q4 are negligible during normal operation of Q1–Q4 such that the collector current (IC) is approximated as the emitter current ($I_E$) for purposes of estimating power dissipation. Thus, for example, $I_{CQ1} \approx I_{EQ1} = I1$. The collector current for Q6 can then be determined from I1 and the tip current $I_{RT}$. $V_{CEQ6}$ is known from the voltage sampled at node 362 and $V_{BAT}$. Thus the instantaneous power dissipation of Q6 is calculated as follows:

$$p_{Q6}=(V_{362}-V_{BAT})\cdot(I1+I_{RT})$$

With respect to Q5, the ring current through RR (i.e., $I_{RR}$) is determined as $$I_{RR} = \frac{V_{364} - V_{366}}{RR}.$$

$V_{CEQ5}$ is known from the voltage sampled at node 366 and $V_{BAT}$. The collector current for Q5 is determined from I3 and the ring current $I_{RR}$. Thus the instantaneous power dissipation of Q5 can be calculated as follows:

$$p_{Q5}=(V_{366}-V_{BAT})\cdot(I3+I_{RR})$$

The calculated instantaneous power value for the selected component is then filtered by a digital filter 550 to provide an estimated transistor junction temperature signal 552. In one embodiment, filter 550 includes a re-writable nonvolatile memory to permit programming the filter with filter parameters specific to the thermal characteristics of different linefeed transistors. Thus filter 550 can be programmed to handle transistors with different thermal characteristics as the need arises. In one embodiment, the filter 550 is a low pass filter. Comparator 560 provides a thermal alarm indicator 564, if the estimated junction temperature signal 552 exceeds a pre-determined junction temperature corresponding to alarm threshold 562.

The monitoring function implemented within the signal processor 510 can be achieved using low voltage, fineline, low cost circuitry. In one embodiment, the monitoring is performed on a time-shared basis such that only one ADC 520, power calculator 540, and digital filter 550 are needed to monitor all the linefeed driver transistors as illustrated in FIG. 5. This can be accomplished, for example, through the use of multiplexer 570 with a time-based multiplexer control 572. This significantly reduces the die size that would otherwise be needed for dedicated, continuous, non-clocked monitoring of each linefeed transistor or each node 360–364. In addition, ADC 520 may be implemented as a low speed ADC given that thermal events tend to occur slowly. For example, in one embodiment, ADC 520 is a six bit converter with a sampling rate of a few hundred Hertz.

Figure 6:
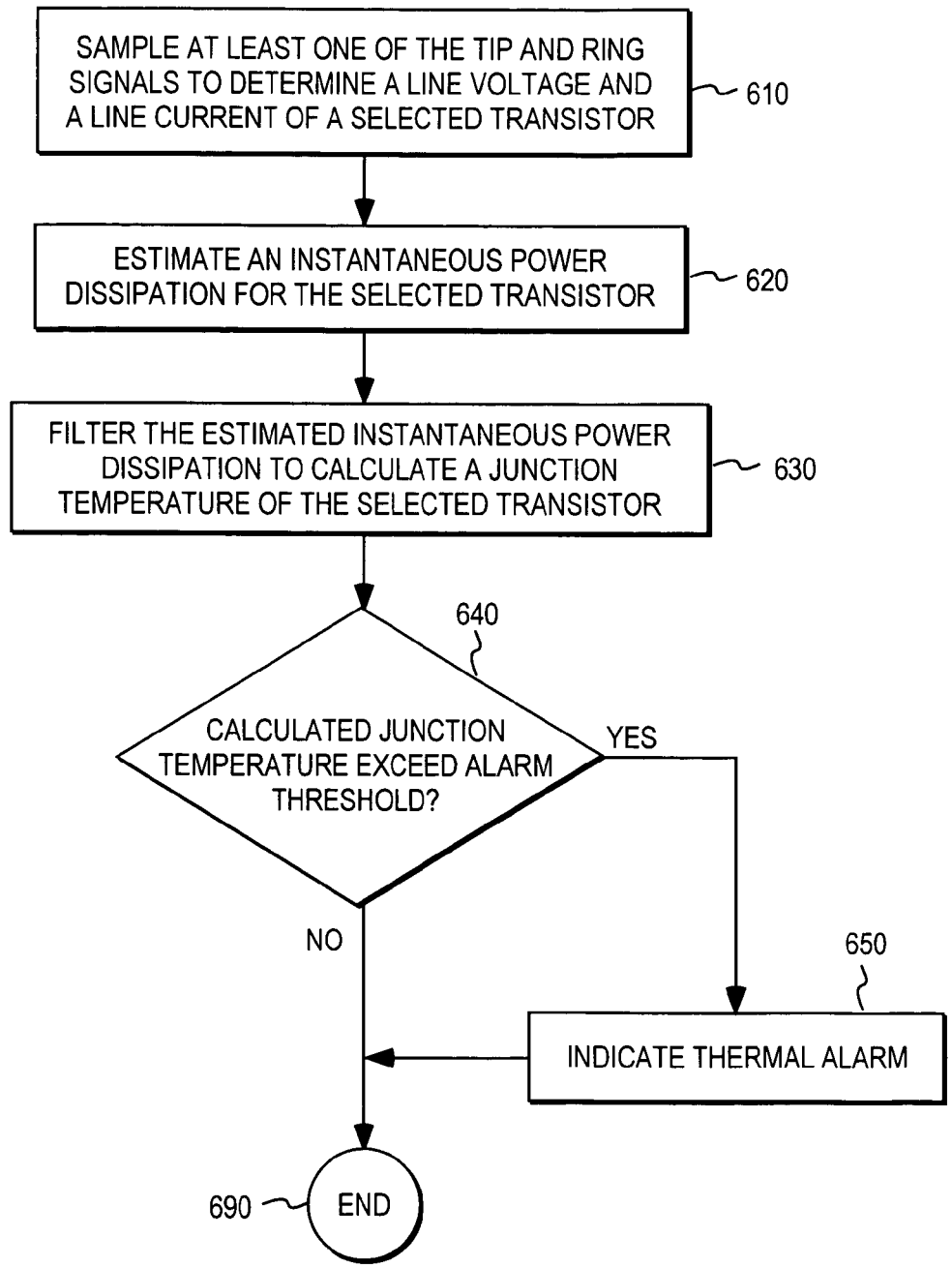
FIG. 6 illustrates a method for monitoring power dissipation of a selected linefeed driver component.

FIG. 6 illustrates a method of applying the monitoring function to a selected transistor. In step 610, the line voltage and line current associated with a selected transistor are determined. The instantaneous power dissipation is calculated in step 620. In step 630, the instantaneous power is filtered to generate an estimated junction temperature for the selected linefeed transistor. The filter is pre-programmed with the appropriate filter parameters corresponding to thermal characteristics particular to the linefeed components. Step 640 determines whether the estimated junction temperature exceeds a pre-determined threshold value. If so, then a thermal alarm is provided in step 650. Otherwise the method is completed in step 690.

Another advantage of implementing the monitoring function in the low voltage device as indicated in FIG. 5 is that the digital representation of the line voltages and line currents stored in registers 530 are available for more sophisticated diagnosis of the type of fault condition. These values are also useful for detecting events such as parallel offhook terminal devices as well as for testing the board level of the integrity of the signal processor, the discrete components of the linefeed driver circuitry, and board routing. Yet another advantage is that the digital filter time constant and alarm threshold can be fully programmable.

Subscriber loop interface circuitry is typically used in conjunction with fuses and overvoltage protection in order to ensure that voltages impressed upon the tip and ring lines do not destroy or otherwise create an electrical or fire hazard for the subscriber loop interface circuitry. In overvoltage conditions such as a power cross condition, signals as large as 600 V with high current sourcing capability may exist on tip and ring. Protective devices such as fuses are designed to "blow open" in order to avoid damage to the subscriber loop interface circuit 770 and to reduce the risk of fire. All circuitry that cannot withstand 600 V must reside behind the protective fuses.

This creates difficulties during board level testing if the line monitoring sense points are observing the TIP and RING line voltages behind the fuses (i.e., protected by the fuses). In such a case, condition of the tip or ring lines may not be readily determinable if a fuse is missing, blown, or improperly seated. Without knowledge of the condition of the fuse, further testing may not adequately indicate whether a problem is with the fuse or somewhere else in the subscriber loop.

One method of verifying the fuse status entails attaching an external load and monitoring the current while driving a voltage signal on the line to determine if the fuse is installed. Alternatively, additional dedicated leads may be used for the sole purpose of measuring the unprotected tip and ring signals. The first solution involves additional manual steps. The second method tends to undesirably increase the number of pins required to implement such functionality on the signal processor.

The use of the external discrete components as opposed to a high voltage integrated circuit for the linefeed driver enables more extensive testing for diagnostic purposes. External discrete components (e.g., resistors) significantly attenuate the line voltages provided to the signal processor. This attenuation protects the signal processor from large voltages on the line. In particular, the attenuation protects the signal processor from voltage conditions that a high voltage integrated circuit driving the line directly would not be able to tolerate. This enables placement of at least a portion of each of the tip and ring sense circuits on the unprotected side of any tip and ring line fuses. Thus in one embodiment, the low voltage signal processor is able to diagnose other conditions such as whether a fuse is blown without the need for any additional pins.

FIG. 7 illustrates subscriber loop interface circuitry including protective devices such as fuses 782, 792 and overvoltage protection 730. In overvoltage conditions such as a power cross condition, signals as large as 600 V with high current sourcing capability may exist on TIP 780 and RING 790. Protective devices such as fuses 782 and 792 are designed to "blow open" in order to avoid damage to the subscriber loop interface circuit 770 and to reduce the risk of fire. All circuitry that cannot withstand 600 V must reside behind the protective fuses 782 and 792.

Signal processor 710 includes TIP/RING sense circuitry 770 with dedicated sense circuitry for each sensed node. One embodiment of the sense circuitry 772 is illustrated for TIP1. For the TIP1 772 sense circuitry illustrated, a 400 KΩ sense resistor (i.e., RS1) exposed to a 600 V tip voltage would generate a sense current, $I_{SENSE}$ of 1.5 mA. Such a current level is well within the tolerance of the low voltage integrated circuit signal processor 710. In contrast, however, a typical high voltage integrated circuit has a maximum voltage rating less than 150 V. Thus a high voltage integrated circuit driving the lines directly would be destroyed in the event of a 600 V tip voltage.

As a result of the attenuation, the low voltage signal processor can sense the tip and ring lines across the series-coupled inline components including the typical protection resistors or fuses 782 and 792 such that for a pair of sense lines, one of the pair is not protected by the fuse and the other is electrically protected by the fuse. Thus instead of sampling TIP at nodes 762 and 763, one of the tip sense lines can be moved across to the unprotected side of fuse 782 at node 760 as indicated by the dotted line at node 763. Similarly, instead of sampling RING at nodes 765 and 766, one of the ring sense lines can be moved to the unprotected side of fuse 792 at node 764 as indicated by the dotted line at node 765. Thus tip sensing can be accomplished across series-coupled tip fuse 782 and tip resistor RT. Similarly, ring sensing can be accomplished across series-coupled ring fuse 792 and ring resistor RR.

Due to the ability to accommodate large subscriber loop voltages, the functions of tip and ring sense can be combined with the monitoring of the line before the fuses to enable determining the status of the line or fuses without any additional pins for signal processor 710. If one of the tip sense leads (732) is coupled to TIP 780 at node 760 in front of fuse 782, the tip line voltage can be directly monitored. Similarly if one of the ring sense leads (736) is coupled to RING 790 at node 764 in front of fuse 792, the ring line voltage can be directly monitored.

With direct (before the fuse) monitoring of the tip and ring lines, the line voltage can be directly monitored in a no-load condition to determine if the fuses 782 and 792 have been properly installed. In addition, if the fuses blow in the field, the line voltages can still be directly monitored to determine if the power cross condition still exists or if it has been removed, thus providing additional diagnostic capabilities over current solutions. For an integrated circuit signal processor, this avoids the introduction of extra pins or pins dedicated to monitoring line conditions on the unprotected side of the fuses. This effectively eliminates two pins from the signal processor integrated circuit package such that only four pins are needed to accomplish tip sensing, ring sensing, and direct line monitoring.

Thus the signal processor integrated circuit package has a first pair of pins for sensing a tip line voltage and a second pair of pins for sensing a ring line voltage, wherein at least one of the first pair of pins is coupled to an unprotected side of a tip fuse, wherein at least one of the second pair of pins is coupled to an unprotected side of a ring fuse. Two of the pins sense line conditions before the fuses such that no more than four pins are needed for determining tip and ring line conditions before and after the fuses as well as calculating line voltages and line currents of the linefeed component.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising the steps of:
   a) sampling at least one of a tip and a ring signal to determine a line voltage and a line current of a linefeed component of a subscriber loop;
   b) estimating an instantaneous power dissipation of the linefeed component using the line voltage and line current; and
   c) filtering the estimated instantaneous power dissipation to generate an estimated junction temperature of the linefeed component.

2. The method of claim 1 further comprising the step of:
   d) generating a thermal alarm, if the estimated junction temperature exceeds an alarm threshold.

3. The method of claim 2, further comprising the step of:
   e) timesharing a same monitoring circuitry to perform steps a)-d) for each linefeed driver component being monitored.

4. The method of claim 1 further comprising the step of:
   d) providing a filter with filtering parameters corresponding to thermal characteristics of the linefeed component.

5. A method comprising the steps of:
   a) selecting a selected linefeed component of a plurality of linefeed components coupled to a subscriber loop having a tip signal and ring signal;
   b) sampling at least one of the tip and the ring signals to determine a voltage and a current associated with the selected linefeed component;
   c) estimating an instantaneous power dissipation of the selected linefeed component using the associated voltage and current; and
   d) filtering the estimated instantaneous power dissipation to generate an estimated junction temperature of the selected linefeed component.

6. The method of claim 5 further comprising the step of
   e) providing a thermal alarm indicator, if the estimated junction temperature exceeds an alarm threshold.

7. A subscriber loop signal processor apparatus, comprising:
   an analog-to-digital converter (ADC) for sampling at least one of a tip and a ring signal;
   a power calculator coupled to calculate an instantaneous power dissipation of a selected linefeed driver component from the sampled signal and control currents provided to a plurality of linefeed driver components; and
   a filter providing an estimated junction temperature of the selected linefeed driver component from the instantaneous power dissipation.

8. The apparatus of claim 7 further comprising:
   a comparator providing an alarm indicator if the estimated junction temperature exceeds an alarm threshold.

9. The apparatus of claim 7 further comprising:
   a multiplexer coupling the at least one tip and ring signal to the analog-to-digital converter to enable providing an estimated junction temperature of any of the linefeed components using a same ADC, power calculator, and filter.

10. The apparatus of claim 9 wherein a multiplexer control is time based to enable time-sharing the same ADC, power calculator, and filter for each linefeed component.

11. The apparatus of claim 7 wherein the ADC, the power calculator, and the filter reside within a same integrated circuit package.

12. The apparatus of claim 7 further comprising:
    a re-writable nonvolatile memory coupled to provide filter parameters corresponding to thermal characteristics of the linefeed components to the filter.

13. A subscriber loop interface circuit apparatus comprising:
    a signal processor having sense inputs for receiving a sensed tip signal and a sensed ring signal from a tip line and a ring line of a subscriber loop, the signal processor generating subscriber loop control signals; and
    a linefeed driver for driving the subscriber loop in accordance with the subscriber loop control signals, the linefeed driver including a tip fuse series-coupled to the tip line and a ring fuse series-coupled to the ring line, wherein the sensed tip signal includes first and second sampled tip voltages sampled from opposing sides of the tip fuse, wherein the sensed ring signal includes first and second sampled ring voltages sampled from opposing ends of the ring fuse.

14. The subscriber loop linefeed driver of claim 13 wherein a difference between the first and second sampled tip voltages is proportional to the tip current, wherein a difference between the first and second sampled ring voltages is proportional to the ring current.

15. A method comprising the steps of:
    generating subscriber loop control signals in response to a sensed tip signal and a sensed ring signal of a subscriber loop, wherein the tip signal is sensed before and after a tip fuse, wherein the ring signal is sensed before and after a ring fuse; and
    driving the subscriber loop in accordance with the subscriber loop control signals.

16. A subscriber loop interface circuit apparatus comprising:
    a signal processor having sense inputs for sensing a tip line and a ring line of a subscriber loop, the signal processor generating subscriber loop control signals; and
    a linefeed driver for driving the subscriber loop in accordance with the subscriber loop control signals, the linefeed driver including a tip fuse series-couples to the tip line and a ring fuse series-coupled to the ring line, wherein the tip line and ring line are each sensed at two locations to determine both a status of each fuse and a power dissipation of each linefeed driver component.

* * * * *